(12) United States Patent
Dai et al.

(10) Patent No.: US 11,949,528 B2
(45) Date of Patent: Apr. 2, 2024

(54) INFORMATION INTERACTION METHOD AND APPARATUS, AND ELECTRONIC DEVICE

(71) Applicant: Beijing Bytedance Network Technology Co., Ltd., Beijing (CN)

(72) Inventors: Zhenli Dai, Shanghai (CN); Jingsheng Yang, Shanghai (CN); Decai Liu, Shanghai (CN); Mengyuan Xiong, Shanghai (CN); Xin Zhang, Shanghai (CN); Jiaxi Xiahou, Shanghai (CN); Haoran Pang, Shanghai (CN); Ziyun Qi, Shanghai (CN)

(73) Assignee: Beijing Bytedance Network Technology Co., Ltd. (CN)

( * ) Notice: Subject to any disclaimer, the term of this patent is extended or adjusted under 35 U.S.C. 154(b) by 0 days.

(21) Appl. No.: 17/866,813

(22) Filed: Jul. 18, 2022

(65) Prior Publication Data

US 2022/0376939 A1 Nov. 24, 2022

Related U.S. Application Data

(63) Continuation-in-part of application No. PCT/CN2021/080887, filed on Mar. 15, 2021.

(30) Foreign Application Priority Data

Mar. 27, 2020 (CN) .......................... 202010232284.2

(51) Int. Cl.
*H04L 12/18* (2006.01)
*G06F 3/0482* (2013.01)
*H04L 67/02* (2022.01)

(52) U.S. Cl.
CPC ........ *H04L 12/1822* (2013.01); *G06F 3/0482* (2013.01); *H04L 67/02* (2013.01)

(58) Field of Classification Search
CPC .......... H04N 21/2187; H04N 21/4781; H04N 21/4788; H04L 65/70; H04L 65/611; H04L 65/61
See application file for complete search history.

(56) References Cited

U.S. PATENT DOCUMENTS 9,253,223 B1 2/2016 Cushing et al.
9,792,083 B2 * 10/2017 Coffman ................. G06F 3/165
(Continued)

FOREIGN PATENT DOCUMENTS

CN 104754284 A 7/2015
CN 104754396 A 7/2015
(Continued)

OTHER PUBLICATIONS

Supplementary European Search Report dated Jul. 27, 2023 in European Application No. 21774569.4 (11 pages).
(Continued)

*Primary Examiner* — Chirag R Patel

(57) ABSTRACT

Disclosed are an information interaction method and apparatus, and an electronic device. One specific embodiment of the method comprises: in response to a user logging in to a live interface initiated based on a multimedia conference, displaying a live data stream of the multimedia conference in the live interface initiated based on the multimedia conference, wherein the live data stream is generated on the basis of an interactive data stream of a participating user of the multimedia conference; receiving interactive content input by the user on the basis of the live data stream, and generating interactive information according to the interactive content; and sending the interactive information to a serving end, so as to instruct the serving end to send the interactive information to a terminal device that displays the live interface. The communication efficiency of information
(Continued)

related to the content of a multimedia conference is thus improved.

30 Claims, 4 Drawing Sheets

(56) References Cited

U.S. PATENT DOCUMENTS

| | | | |
|---|---|---|---|
| 10,475,453 B2* | 11/2019 | Higbie | G06F 3/165 |
| 11,055,332 B1* | 7/2021 | Cierniak | G06F 16/338 |
| 2004/0034723 A1* | 2/2004 | Giroti | H04L 12/66 |
| | | | 710/8 |
| 2013/0159711 A1* | 6/2013 | Kaal | H04L 65/1069 |
| | | | 713/168 |
| 2016/0261921 A1* | 9/2016 | Malko | H04N 21/47815 |
| 2016/0277802 A1* | 9/2016 | Bernstein | H04N 21/44213 |
| 2018/0004723 A1* | 1/2018 | Eldredge | G06F 16/958 |
| 2019/0166394 A1* | 5/2019 | Lin | H04N 21/47217 |
| 2019/0281343 A1* | 9/2019 | Hussain | A63F 13/352 |
| 2021/0019982 A1* | 1/2021 | Todd | H04N 21/4438 |
| 2021/0281569 A1* | 9/2021 | Soon-Shiong | G06F 16/21 |

FOREIGN PATENT DOCUMENTS

| | | |
|---|---|---|
| CN | 107135207 A | 9/2017 |
| CN | 107155139 A | 9/2017 |
| CN | 104754396 B | 2/2018 |
| CN | 107888989 A | 4/2018 |
| CN | 108055496 A | 5/2018 |
| CN | 108833175 A | 11/2018 |
| CN | 109309802 A | 2/2019 |
| CN | 110392226 A | 10/2019 |
| CN | 110446001 A | 11/2019 |
| CN | 110798696 A | 2/2020 |
| CN | 112291504 A | 1/2021 |
| JP | 2000050226 A | 2/2000 |
| JP | 2004165756 A | 6/2004 |
| JP | 2008022552 A | 1/2008 |
| WO | 2016127691 A1 | 8/2016 |
| WO | 2017166517 A1 | 10/2017 |

OTHER PUBLICATIONS

Microsoft Healthcare And Life Blog Videos: "How to Use Chat in a Microsoft Teams Meeting," Mar. 21, 2020, available at https://www.youtube.com/watch?v=Ua7n_eJmBto (2 pages).

* cited by examiner

INFORMATION INTERACTION METHOD AND APPARATUS, AND ELECTRONIC DEVICE

The present application is a continuation of International Patent Application No. PCT/CN2021/080887 filed on Mar. 15, 2021, which claims the priority to Chinese Patent Application No. 202010232284.2, titled "INFORMATION INTERACTION METHOD AND APPARATUS, AND ELECTRONIC DEVICE", filed on Mar. 27, 2020 with the Chinese Patent Office, both of which are incorporated herein by reference in their entireties.

FIELD

The present disclosure relates to the technical field of internet, and in particular to an information interaction method, an information interaction apparatus, and an electronic device.

BACKGROUND

In a network multimedia conference, information such as moving images, voice, and application data (including an electronic whiteboard, graphics, and the like) may be transmitted between two points and multiple points in real time. The network multimedia conference is suitable for remote conferences, network discussions and the like. People at two or more locations may interact through networked multimedia conferences.

In a network multimedia conference, a multimedia conference server usually receives multimedia data streams transmitted by participating users of the multimedia conference, and interactively transmits the multimedia data streams transmitted by the participating users of the multimedia conference.

SUMMARY

The content part of the present disclosure is provided to introduce concepts in a brief form, and these concepts are to be described in detail in the following embodiments. The content of the present disclosure is not intended to identify the key features or essential features of the claimed technical solutions, nor is it intended to be used to limit the scope of the claimed technical solutions.

According to the embodiments of the present disclosure, an information interaction method, an information interaction apparatus, and an electronic device are provided.

In a first aspect, an information interaction method is provided according to some embodiments of the present disclosure. The method is applied to a terminal device. The method includes: in response to a user logging in a live interface initiated based on a multimedia conference, displaying a live data stream of the multimedia conference in the live interface initiated based on the multimedia conference, where the live data stream is generated based on an interactive data stream of a participating user of the multimedia conference; receiving an interactive content inputted by the user based on the live data stream, and generating interactive information based on the interactive content; and transmitting the interactive information to a server to instruct the server to transmit the interactive information to a terminal device presenting the live interface.

In a second aspect, an information interaction method is provided according to some embodiments of the present disclosure. The method is applied to a server. The method includes: in response to receiving an acquisition request from a terminal device for acquiring a live data stream of a multimedia conference, transmitting the live data stream to the terminal device, where the terminal device displays the live data stream in a live interface, the acquisition request is generated by the terminal device according to a user's login operation of the live interface, the live interface initiated based on the multimedia conference, and the live data stream is generated based on an interactive data stream of a participating user of the multimedia conference; receiving interactive information from the terminal device, where the interactive information is generated based on interactive content inputted by the user based on the live data stream; and transmitting the interactive information to a terminal device presenting the live interface, where the terminal device displays the interactive information in the live interface.

In a third aspect, an information interaction apparatus is provided according to some embodiments of the present disclosure. The apparatus is applied to a terminal device. The apparatus includes: a display unit, a first reception unit, and a first transmission unit. The display unit is configured to in response to a user logging in a live interface initiated based on a multimedia conference, display a live data stream of the multimedia conference in the live interface initiated based on the multimedia conference, where the live data stream is generated based on an interactive data stream of a participating user of the multimedia conference. The first reception unit is configured to receive an interactive content inputted by the user based on the live data stream, and generate interactive information based on the interactive content. The first transmission unit is configured to transmit the interactive information to a server to instruct the server to transmit the interactive information to a terminal device presenting the live interface.

In a fourth aspect, an information interaction apparatus is provided according to some embodiments of the present disclosure. The apparatus is applied to a server. The apparatus includes: a second transmission unit, a second reception unit, and a third transmission unit. The second transmission unit is configured to: in response to receiving an acquisition request from a terminal device for acquiring a live data stream of a multimedia conference, transmit the live data stream to the terminal device, where the terminal device displays the live data stream in a live interface, the acquisition request is generated by the terminal device according to a user's login operation of the live interface, the live interface initiated based on the multimedia conference, and the live data stream is generated based on an interactive data stream of a participating user of the multimedia conference. The second reception unit is configured to receive interactive information from the terminal device, where the interactive information is generated based on interactive content inputted by the user based on the live data stream. The third transmission unit is configured to transmit the interactive information to a terminal device presenting the live interface, where the terminal device displays the interactive information in the live interface.

In a fifth aspect, an electronic device is provided according to some embodiments of the present disclosure. The electronic device includes one or more processors and a storage device. The storage device stores one or more programs. The one or more programs, when executed by the one or more processors, cause the one or more processors to perform the method provided in the first aspect or the method provided in the second aspect.

In a sixth aspect, a computer-readable medium is provided according to some embodiments of the present disclosure. The computer-readable medium stores a computer program. The computer program, when executed by a processor, causes the processor to perform the method provided in the first aspect or the method provided in the second aspect.

An information interaction method, an information interaction apparatus, and an electronic device are provided according to the embodiments of the present disclosure. In the present disclosure, in response to a user logging in a live interface initiated based on a multimedia conference, a live data stream of the multimedia conference is displayed in the live interface initiated based on the multimedia conference, where the live data stream is generated based on an interactive data stream of a participating user of the multimedia conference; an interactive content inputted by the user based on the live data stream is received, and interactive information is generated based on the interactive content; and the interactive information is transmitted to a server to instruct the server to transmit the interactive information to a terminal device presenting the live interface. Compared with the conventional multimedia conference, in which only a participating user of the multimedia conference may transmit interactive information, and a user viewing the live data stream of the multimedia conference cannot exchange information with the participating user or other viewing users of the multimedia conference for the content of the multimedia conference, a channel, for a viewing user of a multimedia conference to transmit interactive information of the multimedia conference, is provided according to the present disclosure. The user of the multimedia conference can browse the interactive information, transmitted by the viewing user of the multimedia conference, in real time in an interface of the multimedia conference. Compared with the conventional multimedia conference in which only the participating user of the multimedia conference can exchange information, with the present disclosure, the communication efficiency of information related to the content of the multimedia conference is improved.

BRIEF DESCRIPTION OF THE DRAWINGS

The above and other features, advantages and aspects of the embodiments of the present disclosure will be more apparent in conjunction with the accompanying drawings and with reference to the following embodiments. Throughout the drawings, the same or similar reference numerals represent the same or similar elements. It should be understood that the drawings are schematic and the originals and elements are unnecessarily drawn to scale.

DETAILED DESCRIPTION OF THE EMBODIMENTS

The embodiments of the present disclosure are described in detail below with reference to the accompanying drawings. Although the drawings show some embodiments of the present disclosure, it should be understood that the present disclosure can be implemented in various forms and is not limited to the embodiments. The embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include additional steps and/or omit to perform the illustrated steps, not limiting the scope of the present disclosure.

The term "including" and its variants as used herein are open-ended includes, that is, "including but not limited to". The term "based on" means "based at least in part on". The term "one embodiment" means "at least one embodiment". The term "another embodiment" means "at least one additional embodiment". The term "some embodiments" means "at least some embodiments". Definitions of other terms are provided in the following description.

It should be noted that concepts such as "first" and "second" mentioned in the present disclosure are only used to distinguish different devices, modules or units, and are not intended to limit the order of functions performed by the devices, modules or units or the interdependence of the devices, modules and units.

It should be noted that the modifications of "one" and "a plurality of" mentioned in the present disclosure are illustrative rather than restrictive, and those skilled in the art should understand that unless the context clearly indicates otherwise, "one" and "a plurality of" should be understood as "one or a plurality of".

Names of messages or information interacted between multiple apparatuses in the embodiments of the present disclosure are illustrative rather than limit the scope of the messages or information.

Figure 1:
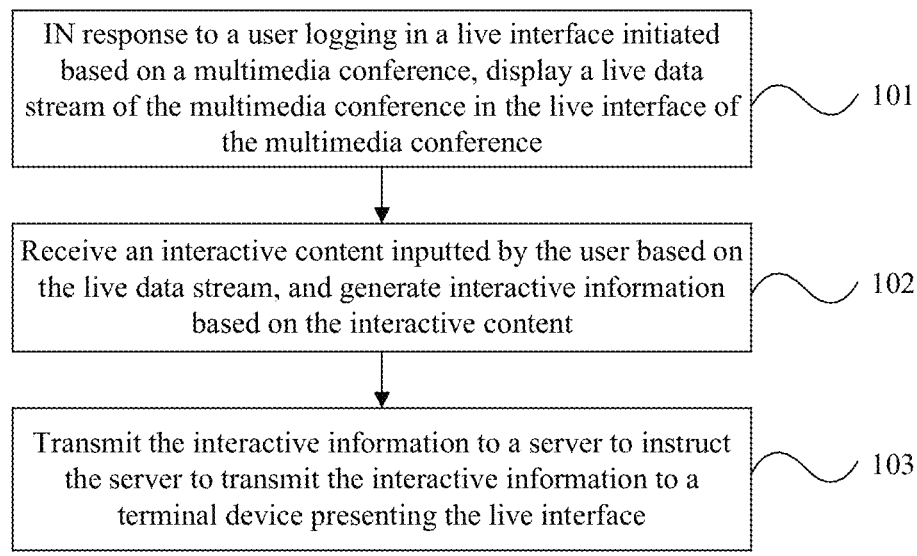
FIG. 1 is a flow chart of an information interaction method according to some embodiments of the present disclosure.

Reference is made to FIG. 1, which shows a flow chart of an information interaction method according to some embodiments of the present disclosure. The information interaction method is applied to a terminal device, and includes the following steps 101 to 103.

In step 101, in response to a user logging in a live interface initiated based on a multimedia conference, a live data stream of the multimedia conference is displayed in the live interface initiated based on the multimedia conference.

In a multimedia conference, information interaction is usually performed by participating users of the multimedia conference. Due to the large amount of interaction data during the multimedia conference, multimedia data streams are to be stuck in a case of a large number of participating users of the multimedia conference. Therefore, the number of participating users of a multimedia conference is usually limited, that is, in a case of not performing living broadcast on the multimedia conference, the users to be affected by the multimedia conference is only the participating users of the multimedia conference.

In order to increase the influence range of the multimedia conference, a live data stream of the multimedia conference may be provided. The live data stream is generated based on an interactive data stream of the participating users of the multimedia conference. The multimedia conference may be an audio conference or a video conference. The viewing user may listen to and/or view the live data stream during the multimedia conference. In some application scenarios, the organizer of the multimedia conference may determine a viewing user and grant the viewing user an authority to view the live data stream.

A participating user of a multimedia conference, or a viewing user watching a live data stream of the multimedia conference, or a preset management user of the multimedia conference may perform a preset live broadcast initiation operation on the terminal device of the user. The terminal device receives the preset live broadcast initiation operation for performing live broadcast on the multimedia conference, and then transmits a live broadcast request to a server for performing live broadcast on the multimedia conference, so that the server generates a live data stream of the multimedia conference based on the live broadcast request. The live data stream is generated based on the interaction data of the participating user of the multimedia conference.

In some application scenarios, the preset live broadcast initiation operation is performed by the participating user of the multimedia conference. The preset live broadcast initiation operation includes: a triggering operation performed by the participating user of the multimedia conference on a live broadcast control for initiating a live broadcast, where the live broadcast control is displayed in a display interface for displaying information of the multimedia conference.

In the application scenarios, a terminal device of the participating user of the multimedia conference may display a display interface for information of the multimedia conference. In a case that the multimedia conference is already in progress, an interactive data stream of the multimedia conference may be displayed in the display interface. In a case that the multimedia conference has not started, multimedia information, such as a conference name and conference items of the multimedia conference, may be displayed in the display interface. In the display interface, a live broadcast control for initiating a live broadcast of the multimedia conference may be displayed. The participating user of the multimedia conference may perform a triggering operation, such as clicking and touching, on the live broadcast control. The terminal device may determine the received triggering operation as a live broadcast initiation operation.

The preset live broadcast initiation operation may be performed before the multimedia conference starts and during the multimedia conference. That is, the time instant at which the preset live broadcast initiation operation is performed includes a time instant before the multimedia conference starts and a time instant in the multimedia conference.

A viewing address of the live data stream of the multimedia conference may be preset and distributed. For example, the viewing address may be distributed to a viewing user of the multimedia conference.

The operation of logging in the live interface initiated based on the multimedia conference may be any operation for obtaining a live data stream. The "logging in" may include, for example, an operation of obtaining a link corresponding to a live broadcast address of the live data stream, and jumping to a live broadcast page corresponding to the live broadcast address according to the link. Alternatively, the "logging in" may include an operation of opening a live broadcast page of the multimedia conference by directly inputting a live broadcast address corresponding to the live data stream in the page. The live page may be a web page, or may be a live room corresponding to a live platform of the live data stream of the multimedia conference. In some application scenarios, the live interface for logging in the multimedia conference further includes a process of inputting identity information to perform authentication on the identity information.

The user may log in the live interface initiated based on the multimedia conference with the terminal device. For example, the user may log in the live interface initiated based on the multimedia conference by clicking a link of a live data stream displayed in a page on the terminal device. After the user logs in the live interface initiated based on the multimedia conference, the terminal device may transmit an acquisition to the server for acquiring a live data stream of the multimedia conference. The server transmits the live data stream of the multimedia conference to the terminal device in real time according to the acquisition request. After obtaining the live data stream, the terminal device may display the live data stream of the multimedia conference in the live interface initiated based on the multimedia conference.

In some application scenarios, the live interface initiated based on the multimedia conference may be arranged in a web page. The user may not have installed an application for playing the live data stream of the multimedia conference in the terminal device, thus it is difficult for the user to watch the live data stream. In a case that the live interface initiated based on the multimedia conference is arranged in the web page, the user may conveniently watch the live data stream of the multimedia conference.

In some application scenarios, the user may browse information on a third-party platform. In these application scenarios, the user may, on the third-party platform, log in a live interface initiated based on a multimedia conference based on an address corresponding to the live data stream of the multimedia conference.

In an embodiment, a link corresponding to the live data stream of the multimedia conference may be displayed on the third-party platform. The user may perform a click operation the link. After receiving the click operation on the link by the user, the terminal device parses the address corresponding to the live data stream of the multimedia conference corresponding to the link, then the live interface initiated based on the multimedia conference is displayed on the third-party platform, and thereby the user logs in the live interface initiated based on the multimedia conference.

In another embodiment, the user may input an address corresponding to the live data stream of the multimedia conference in an address input box on the third-party platform, then the live interface initiated based on the multimedia conference is displayed on the third-party platform, and thereby the user logs in the live interface initiated based on the multimedia conference.

In these application scenarios, the user may directly log in the live interface initiated based on the multimedia conference on the third-party platform. Compared with the conventional technology, in which when the user, browsing information on a third-party platform, wants to watch a live data stream of a multimedia conference, it is required for the user to close the third-party platform, open a multimedia conference application or a web page, and input an address in the opened multimedia conference application or the opened web page, or clicks a link corresponding to an address to log in a live interface, with the present disclosure, the operations performed by the user for logging in a live interface initiated based on a live data stream of a multimedia conference can be reduced, thereby saving the user's time and improving the user experience.

In step 102, interactive content inputted by the user based on the live data stream is received, and interactive information is generated based on the interactive content.

The live broadcast interface may include a display window for playing the live data stream.

In watching the live data stream of the multimedia conference, the user may input interactive content based on the live data stream by using the terminal device. The user may input the interactive content in a text form, a voice form, or other forms.

The terminal device may generate interactive information based on the interactive content. The interactive information may include, for example, identity information of the user and time information of the user transmitting the interactive content. The interactive information may include at least one of text interactive information, voice interactive information, and a default emoticon.

In some application scenarios, such as a scenario in which the content involved in the multimedia conference is serious or there are many participating users of the multimedia conference, the viewing user may transmit text interactive information, thus the participating users of the multimedia conference may watch the text interactive information without interfering with the interactive information flow of the multimedia conference.

In some application scenarios, such as a scenario in which the content involved in the multimedia conference is highly interactive and the viewing user cannot participate in the conference due to the limited number of participating users of the multimedia conference, the viewing user may transmit voice interaction information and/or facial expression information to improve the interactivity of the multimedia conference.

In the information interaction method according to the embodiment of the present disclosure, in response to a user logging in a live interface initiated based on a multimedia conference, a live data stream of the multimedia conference is displayed in the live interface initiated based on the multimedia conference, where the live data stream is generated based on an interactive data stream of a participating user of the multimedia conference; an interactive content inputted by the user based on the live data stream is received, and interactive information is generated based on the interactive content; and the interactive information is transmitted to a server to instruct the server to transmit the interactive information to a terminal device presenting the live interface. Compared with the conventional multimedia conference, in which only a participating user of the multimedia conference may transmit interactive information, and a user viewing the live data stream of the multimedia conference cannot exchange information with the participating user or other viewing users of the multimedia conference for the content of the multimedia conference, a channel, for a viewing user of a multimedia conference to transmit interactive information of the multimedia conference, is provided according to the method in the embodiment of the present disclosure. The user of the multimedia conference can browse the interactive information, transmitted by the viewing user of the multimedia conference, in real time in an interface of the multimedia conference. Compared with the conventional multimedia conference in which only the participating user of the multimedia conference can exchange information, with the method according to the embodiment of the present disclosure, the communication efficiency of information related to the content of the multimedia conference is improved.

In some embodiments, before the step 102, the information interaction method further includes: obtaining a user nickname of the user. The step 102 may include: generating the interactive information based on the interactive content and the user nickname of the user.

The user nickname of the user may be different from the user name of the user. The user nickname may include arbitrary characters.

The obtaining a user nickname of the user may include obtaining a user nickname historically inputted by the user. The user nickname historically inputted by the user is used as a nickname for publishing the current interactive information.

In some application scenarios, the obtaining a user nickname of the user may include obtaining a user nickname inputted by the user watching the live data stream played currently. In an exemplary illustration, a control for inputting a user nickname may be displayed in the live interface initiated based on the multimedia conference. The user clicks the control for inputting the user nickname to input a user nickname. In another exemplary illustration, after the user inputs the interactive content and clicks a sending option for the interactive content, a prompt window may pop up for prompting the user whether to publish the interactive information using the user nickname. The user may perform a selection operation by clicking a selection option, indicating publishing the interactive information using the user nickname, in the prompt window, and input a user nickname in a displayed user nickname inputting window.

The terminal device may generate the interactive information based on the interactive content inputted by the user and the user nickname of the user.

In a live interface displaying the multimedia conference on a terminal device of another user, the displayed interactive information may include a user nickname and interactive content. Thus, the user publishing the interactive information may publish the interactive information without using the real user name of the user, thereby satisfying a requirement for anonymously publishing interactive information by the user.

Further, in these application scenarios, an association relationship between the user and the user nickname is valid in a time period in which the user views the live data stream of the video conference. That is, the user nickname of the user is only valid in the user viewing the live data stream, and becomes invalid at the end of the live data stream, thereby facilitating protecting the privacy of the user.

In some embodiments, before the step 101, the information interaction method further includes the following steps.

Firstly, identity information of the user is obtained based on a preset operation performed by the user on a login control.

Secondly, the identity information of the user is transmitted to the server to determine whether the user has an authority to obtain the live data stream.

In the embodiments, the identity information of the user may include, for example, a user name for distinguish different users.

The identity information of the user for logging in may be a user name for logging in an application or user personal information tied to the user. The user name may be user identity information applied for and registered by the user and distinguishing different users.

A user list including users having an authority for viewing the live data stream of the multimedia conference may be preset. The user list may include identity information corresponding to each of multiple preset users.

The terminal device may transmit the identity information of the user to the server. The server determines whether the user list including the users having the an authority for viewing the live data stream includes the identity information of the user. In a case that the user list includes the identity information of the user, it is determined that the user has an authority for obtaining the live data stream. In a case that the user list does not include the identity information of the user, it is determined that the user does not have an authority for obtaining the live data stream.

In the embodiments, it is determined based on the identity information of the user whether the user has an authority for obtaining the live data stream, thereby improving security of information of a multimedia conference.

In some embodiments, the step 102 may include: in response to the number of characters of the received interactive content inputted by the user exceeding a preset threshold, displaying a prompt message for prompting that the number of characters exceeds a number limit.

In the live interface initiated based on the multimedia conference, the live data stream and the interactive information are displayed. In a case that the user inputs too much interactive content, a large region on the live interface is occupied, reducing display effect of displaying interactive information of multiple users.

The preset threshold may be, for example, 40, 50, and 60, and may be configured according to specific application scenarios, which is not limited herein.

In a case that the number of characters of the interactive content inputted by the user exceeds the preset threshold, interactive content subsequently inputted by the user is not to be reflected in the interactive information.

In the case that the number of characters of the interactive content inputted by the user exceeds the preset threshold, a prompt message for prompting that the number of characters of the interactive content inputted by the user exceeds the number limit may be displayed, facilitating reducing invalid information inputting by the user and improving the user experience.

In some embodiments, the step 103 may include: transmitting the interactive information to the server, so that the server determines based on the interactive information whether to transmit the interactive information to a terminal device presenting the live interface.

In the embodiments, the server may review the interactive information before transmitting the interactive information of the user to the terminal device presenting the live interface. For example, the server may determine whether the interactive information includes sensitive words, determine whether the interactive information is related to the content of the multimedia conference, and determine whether the interactive information has a tendency to slander others.

The server reviews the interactive information, and then determines whether to transmit the interactive information to the terminal device presenting the live interface that displays the live data stream, thereby improving purity of interactive information displayed in the live interface.

In some embodiments, the determining, by the server based on the interactive information, whether to transmit the interactive information to the terminal device presenting the live interface includes: in a case that the server determines not to transmit the interactive information to the terminal device presenting the live interface, transmitting, by the server, a feedback message to the terminal device of the user for prompting that the interactive information is not approved.

Further, the information interaction method includes: in response to receiving the feedback message transmitted by the server for prompting that the interactive information is not approved, displaying the feedback message to the user.

That is, after receiving the feedback message, the terminal device may display the feedback message in a pop-up window mode, a floating window mode, or the like.

In the embodiments, the user, based on the feedback message, may learn that the interactive information transmitted by the user has not been transmitted to other users, and then the user determines whether to edit interactive information continuously.

In some embodiments, the information interaction method further includes: in response to receiving a feedback message transmitted by the server for prompting that the interactive information is not approved, displaying an interactive text content corresponding to the interactive information in a text information input box displayed in the live interface.

In the embodiments, the interactive text content corresponding to the interactive information is displayed in the text information input box, facilitating browsing, by the user, the interactive information inputted by the user, and facilitating adjusting, by the user, the interactive content in the text information input box for transmission.

In some embodiments, the information interaction method further includes: displaying the interactive information of the user in the live interface. The interactive information may be displayed in at least one of a list mode, a bullet screen mode, and a floating window mode. The interactive information includes the interactive content, identity information of the user transmitting the interactive content, and time information of the user transmitting the interactive content.

The identity information of the user may be the user nickname of the user.

The interactive information of the user may include interaction information inputted by multiple users based on the live data stream. The interactive information of the user includes at least one piece of information.

In some application scenarios, the interactive information may be displayed in the list mode in the live interface.

In the application scenarios, the live interface may be divided into a first region for playing the live data stream and a second region for displaying an interactive information list. The second region may be located on a right side, a left side, an upper side, or a lower side of the first region.

In some application scenarios, interactive information of multiple users may be displayed in the bullet screen mode in the live interface initiated based on the multimedia conference. The bullet screen may be moved from left to right or from right to left in the live interface playing the live data stream.

In some application scenarios, the interactive information of multiple users may be displayed in the floating window mode in the live interface playing the live data stream.

In some application scenarios, the user may select a display mode for displaying the interactive information. The terminal device displays the interactive information of the multiple users in the display mode selected by the user. The user may select more than one display mode for displaying the interactive information.

In some embodiments, multiple pieces of interactive information of at least one user are displayed sequentially in an interactive information list according to time instants at which the multiple pieces of interactive information are transmitted.

In the embodiment, multiple pieces of interactive information of at least one user may be displayed in an interactive information list.

For example, the multiple pieces of interactive information may be displayed sequentially in the list in a front-to-back order of the time instants at which the multiple pieces of interactive information are transmitted. Alternatively, the multiple pieces of interactive information may be displayed sequentially in the list in a back-to-front order of the time instants at which the multiple pieces of interactive information are transmitted.

The multiple pieces of interactive information are displayed in the list chronologically, facilitating reading, by the user, the interactive information.

In some embodiments, topped interactive information is displayed at a top of the list.

In some embodiments, the interactive information of the user is displayed in the list mode.

In some application scenarios, a user having an authority for presetting the multimedia conference may set one or more pieces of topped interactive information in the multiple pieces of interactive information.

The topped interactive information may be, for example, announcement interactive information, or interactive information including interactive content having a great influence. After topping the interactive information, the user may view the interactive information directly at the top of the list when the user needs to search for the topped interactive information. Compared with not topping the interactive information, the time required for the user to search for the topped interactive information from multiple pieces of interactive information can be saved with topping the interactive information.

In some embodiments, the information interaction method further includes:

receiving a scrolling operation performed by the user on the list; and displaying interactive information corresponding to the scrolling operation.

In the embodiments, the interactive information of the user is displayed in the list mode.

The scrolling operation may include, for example, a sliding operation performed by the user by touching a touch screen with a finger and a clicking operation performed by the user on a scroll bar of a list using a mouse.

In the embodiments, the interactive information displayed in the list may be interactive information scrolled to with the scrolling operation performed by the user, thereby facilitating viewing, by the user, interactive content of multiple pieces of interactive information.

In some embodiments, the terminal device is a terminal device used by a user having a preset authority. The information interaction method further includes: in response to receiving a preset operation performed by the user having the preset authority on the displayed interactive information, transmitting information of the preset operation to the server. Thus, the server transmits an operation result corresponding to the preset operation to a terminal device of another user.

The preset operation includes one of topping, deleting, and muting a user transmitting interactive information.

In the embodiments, the interactive information is displayed in the list mode.

In an exemplary illustration, the user having a preset authority may right-click a piece of interactive information. Based on the right-click operation of the user, an editing control is displayed in the interactive information interface. In the editing control, options such as "top", "delete", and "mute" may be displayed. The user having a preset authority may select one of the options to perform an operation corresponding to the selected option.

In some application scenarios, the user having a preset authority may be a host of the multimedia conference. The user having a preset authority may manage interactive information published by a user and the user publishing the interactive information.

After the user having a preset authority performs a topping operation on a piece of interactive information, the terminal device may transmit the interactive information on which topping operation is performed to the server. The server transmits the interactive information to a terminal device presenting the live interface initiated based on each of users, where the interactive information has a topping parameter. Then, the interactive information is displayed on top of the interactive information list displayed in the live interface displayed on the terminal device of each of the users.

After the user having a preset authority performs a deletion operation on a piece of interactive information, the terminal device may transmit the interactive information on which deletion operation is performed to the server. The server transmits the interactive information on which deletion operation is performed to a terminal device presenting the live interface initiated based on each of users. Then, the interactive information is deleted from the interactive information list displayed in the live interface displayed on the terminal device of each of the users.

The user having a preset authority may mute a user publishing interactive information. The terminal device transmits information of the muted user to the server. The server may transmit identity information of the muted user and information indicating that the user is muted to the terminal device presenting the live interface initiated based on each of the users. Then, the information indicating that the user is muted is displayed in the terminal device of each of the users.

In some embodiments, the interactive information of the user is displayed in the bullet screen mode.

The displaying the interactive information of the user in the live interface includes: determining whether to enable the bullet screen mode based on an operation performed by the user on a preset bullet screen control in the live interface.

In the embodiments, a bullet screen control may be arranged in the live interface. For the bullet screen control, a bullet screen function is disabled by default. After the user performs a selection operation, such as clicking and touching, on an option indicating enabling bullet screen function in the bullet screen control, the bullet screen function is enabled, then the interactive information of multiple users is displayed in the bullet screen in the live interface.

In addition, in a case that the interactive information is displayed in the bullet screen mode in the live interface, the bullet screen display of the interaction information of the user in the live interface may be disabled in response to a selection operation, such as clicking and touching, performed by the user on an option indicating disenabling bullet screen function in the bullet screen control.

It should be noted that, based on the operation performed by the user, the interactive information of the user in the bullet screen mode and the interactive information of the user in the list mode may be simultaneously displayed in the live interface initiated based on the multimedia conference.

In the embodiments, the bullet screen is displayed in the live interface presenting the live data stream. Since the bullet screen is displayed in real time, it is convenient for the user, when listening or watching a live data stream segment, to know interactive information of other users for the live data stream segment in real time. Compared with the solution in which the user views in the interactive information list the interactive information of other users for the live data stream segment, the efficiency of information communication can be improved according to the above solution.

Figure 2:
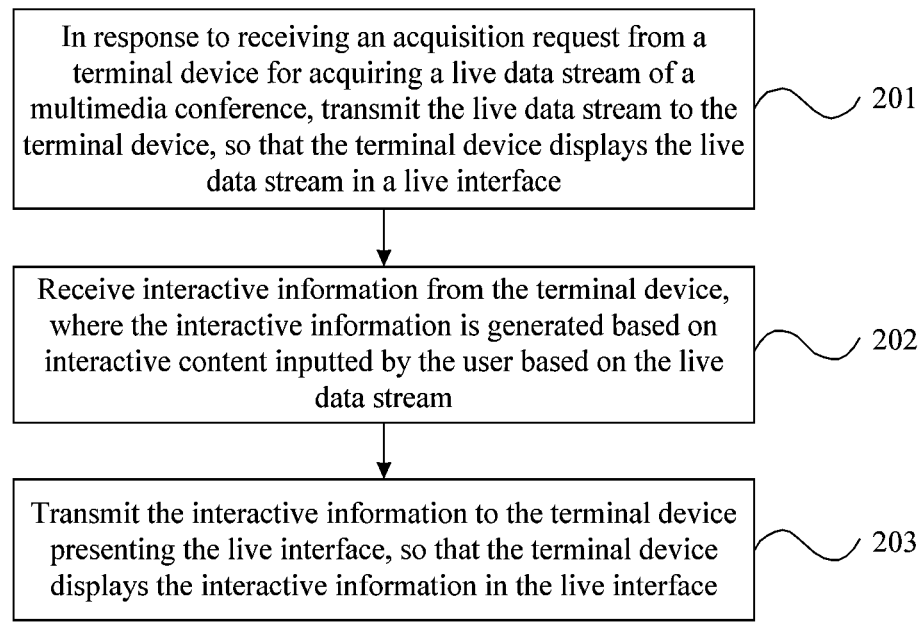
FIG. 2 is a flow chart of an information interaction method according to some embodiments of the present disclosure.

Reference is further made to FIG. 2, which shows a flow chart of an information interaction method according to some embodiments of the present disclosure. The information interaction method may be applied to a server. The information interaction method includes the following steps 201 to 203.

In step 201, in response to receiving an acquisition request from a terminal device for acquiring a live data stream of a multimedia conference, the live data stream is transmitted to the terminal device, so that the terminal device displays the live data stream in a live interface.

The live data stream is determined by a server of the multimedia conference based on the interactive data stream transmitted by the participating user of the multimedia conference.

The acquisition request is generated by the terminal device according to a user's login operation of the live interface, the live interface initiated based on the multimedia conference.

After receiving the acquisition request, the server transmits the live data stream of the multimedia conference corresponding to the acquisition request to the terminal device, so that the terminal device displays the live data stream in the live interface.

The live data stream is generated based on a received live broadcast request. The live broadcast request is transmitted by the terminal device based on a received preset live broadcast initiation operation for performing live broadcast on the multimedia conference.

The live broadcast request may be transmitted by one of the participating user of the multimedia conference, a viewing user and a preset management user of the multimedia conference.

The terminal device may perform the preset live broadcast initiation operation before the multimedia conference starts or during the multimedia conference.

In step 202, interactive information is received from the terminal device. The interactive information is generated based on interactive content inputted by the user based on the live data stream.

In step 203, the interactive information is transmitted to a terminal device presenting the live interface, so that the terminal device displays the interactive information in the live interface.

Detailed descriptions of steps 201 to 203 may refer to the descriptions of the embodiment shown in FIG. 1, and are not repeated herein.

In the embodiment, based on the acquisition request from the terminal device, the live data stream of the multimedia conference is transmitted to the terminal device, so that the terminal device displays the live data stream in a live interface initiated based on the multimedia conference. Interactive information inputted by the user is received from the terminal device, and the interactive information is transmitted to the terminal device presenting the live interface, so that the terminal device displays the interactive information in the live interface. Therefore, the user of the multimedia conference can browse the interactive information, transmitted by the viewing user of the multimedia conference, in real time in an interface of the multimedia conference. Compared with the conventional multimedia conference in which only the participating user of the multimedia conference can exchange information, with the method according to the embodiment of the present disclosure, the communication efficiency of information related to the content of the multimedia conference is improved.

In some embodiments, the step 201 includes: in response to receiving the acquisition request from the terminal device for acquiring the live data stream of the multimedia conference, determining whether the user is a participating user of the multimedia conference based on identity information of the user corresponding to the acquisition request; and in a case that the user is the participating user of the multimedia conference, transmitting the live data stream and a silent playback setting parameter to the terminal device to instruct the terminal device to play the live data stream silently and to display a prompt message of silent playback to the user in text.

In the embodiments, the user viewing the multimedia conference may be a participating user of the multimedia conference. The multimedia data stream of the participating user of the multimedia conference is to be interactively transmitted among the other participating users of the multimedia conference. In order to prevent the interactive data stream of the multimedia conference from being disturbed, in a case that the participating user of the multimedia conference chooses to view the live data stream, the live data stream may be displayed silently to the participating user of the multimedia conference, and a prompt message of silent playback may be displayed to the participating user of the multimedia conference in text.

The participating user of the multimedia conference may have an authority. The user manages the live interactive information, thus the user needs to open both the video conference and the live page. Therefore, in order to avoid echoes, the live data stream may be displayed silently to the participating user of the multimedia conference opening the live interface initiated based on the live data stream, and a prompt message of silent playback may be displayed to the participating user of the multimedia conference in text.

In some embodiments, before step 203, the information interaction method further includes: determining whether to transmit the interactive information to the terminal device presenting the live interface based on the interactive information; in a case of transmitting the interactive information to the terminal device presenting the live interface, transmitting the interactive information to the terminal device presenting the live interface; and in a case of not transmitting the interactive information to the terminal device presenting the live interface, transmitting a feedback message to the terminal device of the user for prompting that the interactive information is not approved.

In the embodiments, the interactive information of the user is reviewed to determine whether to transmit the interactive information to the terminal device presenting the live interface to avoid displaying bad interactive information in the live interface, thereby maintaining the purity of the interactive information.

In some embodiments, the information interaction method further includes: storing the interactive information corresponding to the live data stream of the multimedia conference, and generating an interactive information storage document associated with the multimedia conference.

In an embodiment, in the interactive information storage document, a time instant when the user transmits the interactive information, the interactive content, and identity information of the user transmitting the interactive information are stored in association. The identity information of the user may be the user nickname of the user.

In the embodiments, the storage document for storing interactive information is generated, facilitating viewing the interactive information of the user after the multimedia conference and facilitating performing in-depth excavation on the interactive information.

In some embodiments, the information interaction method further includes: storing the interactive information storage document in a cloud space of a user having a preset authority for the multimedia conference.

In the embodiments, the interactive information may be stored in the cloud space of the user having a preset authority for the multimedia conference, thereby maintaining security of information of the multimedia conference and maintaining security of the interactive information.

In some embodiments, the information interaction method further includes: for each pieces of interactive information, associating the piece of interactive information with a relevant multimedia conference segment corresponding to the piece of interactive information in a recorded live data stream in the interactive information storage document. Thus, the user jumps to a live data stream segment corresponding to a piece of interactive information in the live data stream by clicking on the piece of interactive information.

In the embodiments, for each pieces of interactive information, the piece of interactive information is associated with the relevant multimedia conference segment corresponding to the piece of interactive information in the recorded live data stream in the interactive information storage document. In a case of determining to play a recorded live data stream, the user may view the recorded live data stream and interactive information published by multiple users for the recorded live data stream in the interface displaying the recorded live data stream. For example, the interactive information is displayed in the list mode. In response to clicking on the piece of interactive information by a user, a live data stream segment of a live data stream corresponding to a piece of interactive information is jumped to, thereby facilitating interpreting, by the user, interactive information in combination with live data stream segments.

Figure 3:
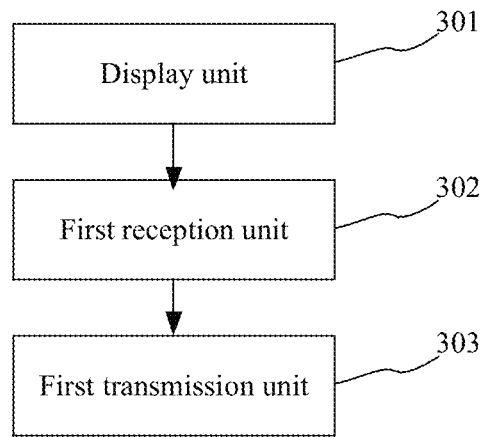
FIG. 3 is a schematic structural diagram of an information interaction apparatus according to some embodiments of the present disclosure.

Reference is further made to FIG. 3, as an implementation of the method shown in FIG. 1, an information interaction apparatus is provided according to some embodiments of the present disclosure. These apparatus embodiments correspond to the method embodiments shown in FIG. 1, and the apparatus may be applied to various electronic devices.

As shown in FIG. 3, the information interaction apparatus according to some embodiments includes: a display unit 301, a first reception unit 302, and a first transmission unit 303. The display unit 301 is configured to in response to a user logging in a live interface initiated based on a multimedia conference, display a live data stream of the multimedia conference in the live interface initiated based on the multimedia conference, where the live data stream is generated based on an interactive data stream of a participating user of the multimedia conference. The first reception unit 302 is configured to receive an interactive content inputted by the user based on the live data stream, and generate interactive information based on the interactive content. The first transmission unit 303 is configured to transmit the interactive information to a server to instruct the server to transmit the interactive information to a terminal device presenting the live interface.

In the embodiments, for the processing of the display unit 301, the first reception unit 302 and the first transmission unit 303 of the information interaction device and the technical effects achieved by the processing of the display unit 301, the first reception unit 302 and the first transmission unit 303 of the information interaction device, one may refer to descriptions of the steps 101, 102 and 103 in the embodiments corresponding to FIG. 1, which are not repeated herein.

In some embodiments, the information interaction apparatus further includes a nickname obtaining unit (not shown in the Figures). The nickname obtaining unit is configured to, before the first reception unit 302 receives the interactive content inputted by the user based on the live data stream and generates interactive information based on the interactive content, obtain a user nickname of the user. The first reception unit 302 is further configured to: generate the interactive information based on the interactive content and the user nickname of the user.

In some embodiments, an association relationship between the user and the user nickname is valid in a time period in which the user views the live data stream.

In some embodiments, the information interaction apparatus further includes a user identity information obtaining unit (not shown in the Figures). The user identity information obtaining unit is configured to, before the display unit 301 displays the live data stream of the multimedia conference in the live interface initiated based on the multimedia conference in response to the user logging in the live interface initiated based on the multimedia conference, obtain identity information of the user based on a preset operation performed by the user on a login control, and transmit the identity information of the user to the server to determine whether the user has an authority to obtain the live data stream.

In some embodiments, the live interface is arranged in a web page.

In some embodiments, the interactive information includes at least one of text interactive information, voice interactive information, and a default emoticon.

In some embodiments, the first reception unit 302 is further configured to: in response to the number of characters of the received interactive content inputted by the user exceeding a preset threshold, display a prompt message for prompting that the number of characters exceeds a number limit.

In some embodiments, the first reception unit 302 is further configured to: transmit the interactive information to the server. The server determines based on the interactive information whether to transmit the interactive information to the terminal device presenting the live interface.

In some embodiments, in a case that the server determines not to transmit the interactive information to the terminal device presenting the live interface, the server transmits a feedback message to the terminal device of the user for prompting that the interactive information is not approved.

In some embodiments, the information interaction apparatus further includes: a feedback information display unit (not shown in the Figures). The feedback information display unit is configured to: in response to receiving the feedback message transmitted by the server for prompting that the interactive information is not approved, display a prompt message of the feedback message to the user for prompting that the interactive information is not approved.

In some embodiments, the information interaction apparatus further includes: a text content display unit (not shown in the Figures). The text content display unit is configured to: in response to receiving a feedback message transmitted by the server for prompting that the interactive information is not approved, display an interactive text content corresponding to the interactive information in a text information input box displayed in the live interface.

In some embodiments, the information interaction apparatus further includes: an interactive information display unit (not shown in the Figures). The interactive information display unit is configured to: display the interactive information of the user in the live interface. The interactive information is displayed in at least one of a list mode, a bullet screen mode, and a floating window mode. The interactive information includes the interactive content, identity information of the user transmitting the interactive content, and time information of the user transmitting the interactive content.

In some embodiments, multiple pieces of interactive information of at least one user are displayed sequentially in an interactive information list according to time instants at which the multiple pieces of interactive information are transmitted.

In some embodiments, topped interactive information is displayed at a top of the list.

In some embodiments, the interactive information display unit is further configured to: receive a scrolling operation performed by the user on the list, and display interactive information corresponding to the scrolling operation.

In some embodiments, the interactive information of the user is displayed in the bullet screen mode.

In some embodiments, the interactive information display unit is further configured to: determine whether to enable the bullet screen mode based on an operation performed by the user on a preset bullet screen control in the live interface.

In some embodiments, the terminal device is a terminal device used by a user having a preset authority. The information interaction apparatus further includes an interactive information management unit (not shown in the Figures). The interactive information management unit is configured to: in response to receiving a preset operation performed by the user having the preset authority on the displayed interactive information, transmit information of the preset operation to the server. The server transmits an operation result corresponding to the preset operation to a terminal device of another user. The preset operation includes one of topping, deleting, and muting a user transmitting interactive information.

In the information interaction apparatus according to the embodiments of the present disclosure, the display unit, in response to a user logging in a live interface initiated based on a multimedia conference, displays a live data stream of the multimedia conference in the live interface initiated based on the multimedia conference, where the live data stream is generated based on an interactive data stream of a participating user of the multimedia conference; the first reception unit receives an interactive content inputted by the user based on the live data stream, and generates interactive information based on the interactive content; and the first transmission unit transmits the interactive information to a server to instruct the server to transmit the interactive information to a terminal device presenting the live interface. Compared with the conventional multimedia conference, in which only a participating user of the multimedia conference may transmit interactive information, and a user viewing the live data stream of the multimedia conference cannot exchange information with the participating user or other viewing users of the multimedia conference for the content of the multimedia conference, a channel, for a viewing user of a multimedia conference to transmit interactive information of the multimedia conference, is provided according to the present disclosure. The user of the multimedia conference can browse the interactive information, transmitted by the viewing user of the multimedia conference, in real time in an interface of the multimedia conference. Compared with the conventional multimedia conference in which only the participating user of the multimedia conference can exchange information, with the present disclosure, the communication efficiency of information related to the content of the multimedia conference is improved.

An information interaction apparatus is provided according to the present disclosure. The apparatus may be is applied to various electronic devices, and specifically may be applied to a terminal device.

The information interaction apparatus includes: a live broadcast initiation operation reception unit and a live broadcast request transmission unit. The live broadcast initiation operation reception unit is configured to receive a preset live broadcast initiation operation for performing live broadcast on a multimedia conference. The live broadcast request transmission unit is configured to transmit a live broadcast request to a server for performing live broadcast on the multimedia conference, so that the server generates a live data stream of the multimedia conference based on the live broadcast request. The live data stream is generated based on interaction data of a participating user of the multimedia conference.

In some embodiments, the preset live broadcast initiation operation is performed by any one of the participating user of the multimedia conference, a viewing user and a preset management user of the multimedia conference.

In some embodiments, the preset live broadcast initiation operation is performed by a participating user of the multimedia conference. The preset live broadcast initiation operation includes: a triggering operation performed by the participating user of the multimedia conference on a live broadcast control for initiating a live broadcast, where the live broadcast control is displayed in a display interface for displaying information of the multimedia conference.

In some embodiments, the preset live broadcast initiation operation is performed before the multimedia conference starts or during the multimedia conference.

Figure 4:
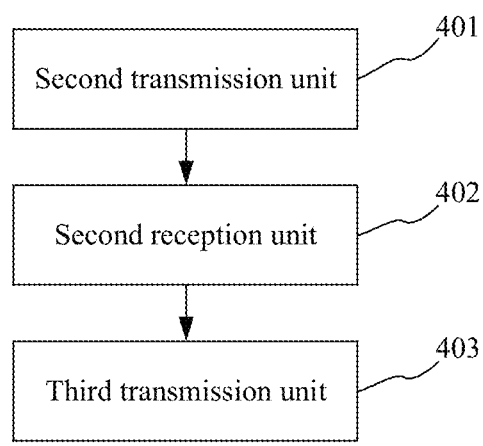
FIG. 4 is a schematic structural diagram of an information interaction apparatus according to some embodiments of the present disclosure.

Reference is further made to FIG. 4, as an implementation of the method shown in FIG. 2, an information interaction apparatus is provided according to some embodiments of the present disclosure. These apparatus embodiments correspond to the method embodiments shown in FIG. 2, and the apparatus may be applied to various electronic devices.

As shown in FIG. 4, the information interaction apparatus according to some embodiments includes: a second transmission unit 401, a second reception unit 402, and a third transmission unit 403. The second transmission unit 401 is configured to: in response to receiving an acquisition request from a terminal device for acquiring a live data stream of a multimedia conference, transmitting the live data stream to the terminal device, wherein the terminal device displays the live data stream in a live interface, the acquisition request is generated by the terminal device according to a user's login operation of the live interface, the live interface initiated based on the multimedia conference, and the live data stream is generated based on an interactive data stream of a participating user of the multimedia conference. The second reception unit 402 is configured to receive interactive information from the terminal device, where the interactive information is generated based on interactive content inputted by the user based on the live data stream. The third transmission unit 403 is configured to transmit the interactive information to a terminal device presenting the live interface, where the terminal device displays the interactive information in the live interface.

In the embodiments, for the processing of the second transmission unit 401, the second reception unit 402 and the third transmission unit 403 of the information interaction device and the technical effects achieved by the processing of the second transmission unit 401, the second reception unit 402 and the third transmission unit 403 of the information interaction device, one may refer to descriptions of the steps 401, 402 and 403 in the embodiments corresponding to FIG. 2, which are not repeated herein.

In some embodiments, the second transmission unit 401 is further configured to: in response to receiving the acquisition request from the terminal device for acquiring the live data stream of the multimedia conference, determine whether the user is a participating user of the multimedia conference based on identity information of the user corresponding to the acquisition request; and in a case that the user is a participating user of the multimedia conference, transmit the live data stream and a silent playback setting parameter to the terminal device to instruct the terminal device to play the live data stream silently and to display a prompt message of silent playback to the user in text.

In some embodiments, the information interaction apparatus further includes an auditing unit (not shown in the Figures). The auditing unit is configured to, before the third transmission unit 403 transmits the interactive information to the terminal device presenting the live interface, determine whether to transmit the interactive information to the terminal device presenting the live interface based on the interactive information; in a case of transmitting the interactive information to the terminal device presenting the live interface, transmit the interactive information to the terminal device presenting the live interface; and in a case of not transmitting the interactive information to the terminal device presenting the live interface, transmit a feedback message to the terminal device of the user for prompting that the interactive information is not approved.

In some embodiments, the information interaction apparatus further includes an interaction information storage unit (not shown in the Figures). The interaction information storage unit is configured to store the interactive information corresponding to the live data stream of the multimedia conference, and generate an interactive information storage document associated with the multimedia conference.

In some embodiments, in the interactive information storage document, a time instant when the user transmits the interactive information, the interactive content, and identity information of the user transmitting the interactive information are stored in association.

In some embodiments, the interactive information storage document is stored in a cloud space of a user having a preset authority for the multimedia conference.

In some embodiments, the interactive information storage unit is further configured to: for each pieces of interactive information, associate the piece of interactive information with a relevant multimedia conference segment corresponding to the piece of interactive information in a recorded live data stream in the interactive information storage document, where a live data stream segment of a live data stream corresponding to a piece of interactive information is jumped to in response to clicking on the piece of interactive information by a user.

Figure 5:
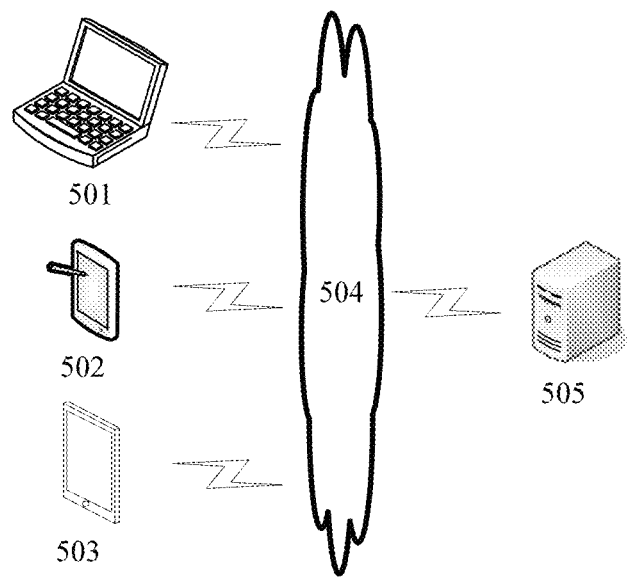
FIG. 5 is an architecture diagram of an information interaction system according to some embodiments of the present disclosure.

Reference is further made to FIG. 5, which shows an exemplary system architecture to which an information interaction method or an information interaction apparatus according to some embodiments of the present disclosure may be applied.

As shown in FIG. 5, the system architecture may include terminal devices 501, 502 and 503, a network 504, and a server 505. The network 504 configured to provide a medium for communication links between the terminal devices 501, 502, 503 and the server 505. The network 504 may include various connections, such as connections based on wired communication links, connections based on wireless communication links, or connections based on fiber optic cables.

The terminal devices 501, 502, and 503 may communicate with the server 505 via the network 504 to receive or transmit messages. Various client applications, such as web browser applications, search applications, and news information applications, may be installed on the terminal devices 501, 502 and 503. The client applications installed on the terminal devices 501, 502, and 503 may receive an instruction from the user, and perform a function based on the instruction from the user, such as adding information based on the instruction from the user.

The terminal devices 501, 502, and 503 may be in a form of hardware or software. In a case that the terminal devices 501, 502, and 503 are in a form of hardware, the terminal devices 501, 502, and 503 may be various electronic devices that have a display screen and support web browsing, including but not limited to smart phones, tablet computers, e-book readers, MP3 (Moving Picture Experts Group Audio Layer III) players, MP4 (Moving Picture Experts Group Audio Layer IV) players, laptops and desktops. In a case that the terminal devices 501, 502, and 503 are in a form of software, the terminal devices 501, 502, and 503 may be installed in the electronic devices listed above. The terminal devices 501, 502, and 503 may be implemented as multiple software or software modules (such as software or software modules for providing distributed services), or may be implemented as a single software or software module, which is not limited herein.

The server 505 may provide various services. For example, the server 505 may receive information acquisition requests from the terminal devices 501, 502, 503, obtain display information corresponding to the information acquisition request in various ways based on the information acquisition request, and transmit data of the display information to the terminal devices 501, 502, 503.

It should be noted that the information processing method according to the embodiments of the present disclosure may be performed by a terminal device, and the information processing apparatus may be arranged in the terminal devices 501, 502, and 503. In addition, the information processing method according to the embodiments of the present disclosure may be performed by the server 505, and the information processing apparatus may be arranged in the server 505.

It should be understood that the numbers of terminal devices, networks and servers in FIG. 5 are only illustrative, and any number of numbers of terminal devices, networks and servers may be configured according to implementation requirements.

Hereinafter, reference is made to FIG. 6, which shows a schematic structural diagram of an electronic device 600

(such as the server or the terminal device shown in FIG. 5) suitable for implementing the embodiments of the present disclosure. The terminal devices according to the embodiments of the present disclosure may include, but are not limited to, mobile terminals, such as mobile phones, laptops, digital broadcast receivers, PDAs (personal digital assistants), PADs (tablet PCs), PMPs (portable multimedia players) and vehicle-mounted terminals (such as in-vehicle navigation terminals), and fixed terminals such as digital TVs and desktop computers. The terminal device/server shown in FIG. 6 is only exemplary, and should not indicate any limitation to the function and application scope of the embodiments of the present disclosure.

Figure 6:
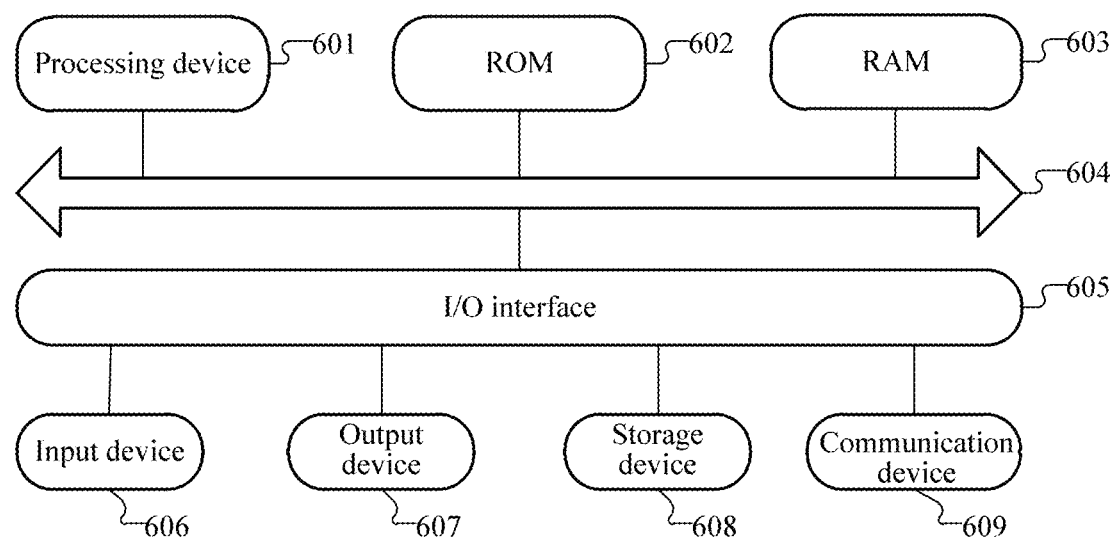
FIG. 6 is a schematic structural diagram of an electronic device suitable for implementing some embodiments of the present disclosure.

As shown in FIG. 6, the electronic device may include a processing device 601 (such as a central processor and a graphics processor) which may execute various operations and processing through a program stored in a Read Only Memory (ROM) 602 or a program loaded from the storage device 608 into a Random Access Memory (RAM) 603. The RAM 603 is further configured to store various programs and data required by the electronic device. The processing device 601, the ROM 602 and the RAM 603 are connected to each other through a bus 604. An Input/output (I/O) interface 605 is also connected to the bus 604.

Generally, the I/O interface 605 may be connected to: an input device 606, such as a touch screen, a touch panel, a keyboard, a mouse, a camera, a microphone, an accelerometer, and a gyroscope; an output device 607, such as a liquid crystal display (LCD), a speaker, and a vibrator; a storage device 608 such as a magnetic tape, a hard disk, and a memory card; and a communication device 609. The communication device 609 enables the electronic device to perform wireless or wired communication with other devices for data exchanging. Although FIG. 6 shows an electronic device having various components, it should be understood that the illustrated components are not necessarily required to all be implemented or included. Alternatively, more or fewer components may be implemented or included. Each of the blocks shown in FIG. 6 may represent one device, or may represent multiple devices as required.

Particularly, according to some embodiments of the present disclosure, the process described above in conjunction with flow charts may be implemented as a computer software program. For example, a computer program product is further provided according to some embodiments of the present disclosure, including a computer program carried on a computer readable medium. The computer program includes program codes for performing the method shown in the flow charts. In the embodiments, the computer program may be downloaded and installed from the network via the communication device 609, or installed from the storage device 608, or installed from the ROM 602. When the computer program is executed by the processing device 601, the above-mentioned functions defined in the method according to the embodiments of the present disclosure are performed.

It should be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In some embodiments of the present disclosure, the computer readable storage medium may be any tangible medium containing or storing a program, and the program may be used by or in combination with an instruction execution system, apparatus, or device. In some embodiments of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

In some embodiments, the client and the server may perform communication using any currently known or future developed network protocol such as HTTP (HyperText Transfer Protocol), and may be interconnected with any form or medium of digital data communication (for example, a communication network). The communication network embodiments include local area networks ("LANs"), wide area networks ("WANs"), internet, end-to-end networks (for example, ad hoc end-to-end networks), and any networks currently known or developed in the future.

The computer readable medium may be incorporated in the electronic device, or may exist alone without being assembled into the electronic device. The computer readable medium carries one or more programs. The one or more programs, when being executed by the electronic device, cause the electronic device to: in response to a user logging in a live interface initiated based on a multimedia conference, displaying a live data stream of the multimedia conference in the live interface initiated based on the multimedia conference, where the live data stream is generated based on an interactive data stream of a participating user of the multimedia conference; receiving an interactive content inputted by the user based on the live data stream, and generating interactive information based on the interactive content; and transmitting the interactive information to a server to instruct the server to transmit the interactive information to a terminal device presenting the live interface; or in response to receiving an acquisition request from a terminal device for acquiring a live data stream of a multimedia conference, transmitting the live data stream to the terminal device, where the terminal device displays the live data stream in a live interface, the acquisition request is generated by the terminal device based on the live interface initiated based on the multimedia conference logged in by a user, and the live data stream is generated based on an interactive data stream of a participating user of the multimedia conference; receiving interactive information from the terminal device, where the interactive information is generated based on interactive content inputted by the user based on the live data stream; and transmitting the interactive information to a terminal device presenting the live interface, where the terminal device displays the interactive information in the live interface.

Computer program code for performing operations of the present disclosure may be written in one or more programming languages, or a combination of the foregoing, and the programming language includes, but is not limited to, object oriented programming languages, such as Java, Smalltalk, and C++, also includes conventional procedural programming languages, such as "C" language or similar programming languages. The program codes may be executed entirely on a user's computer, or be executed partly on the user's computer, or be executed as a stand-alone software package, or be executed partly on the user's computer and partly on a remote computer, or be executed entirely on the remote computer or server. In a case that the execution of the program code involves a remote computer, the remote computer may be connected to a user's computer via any kind of network, including a local area network (LAN) or a wide area network (WAN), or may be connected to an external computer (for example, via an Internet providing by an Internet service provider).

The flow charts and schematic diagrams in the Figures shows the architecture, functionality and operation of possible implementations of the products of system, method and computer program provided according to the embodiments of the present disclosure. Each block in the flow charts or schematic diagrams can represent a module, a program segment, or a part of codes, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It also should be noted that each block in the schematic diagrams and/or flow charts, and combinations of blocks in the schematic diagrams and/or flowcharts, can be implemented by a dedicated hardware-based system which is configured to implement specified functions or operations, or can be implemented by using a combination of dedicated hardware and computer instructions.

The units mentioned in the description of the embodiments of the present disclosure may be implemented by means of software, or otherwise by means of hardware. The designation of these units does not in any case constitute a qualification of the unit itself. For example, the display unit may also be described as "a unit that displays a live data stream of a multimedia conference in a live interface initiated based on the multimedia conference in response to a user logging in the live interface initiated based on the multimedia conference".

The functions described above in this application may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD), and so on.

In the present disclosure, a machine-readable medium may be a tangible medium, which may contain or store a program used by the instruction execution system, apparatus, or device or a program used in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of thereof. The machine-readable storage media, for example, includes an electrical connection based on one or more wires, a portable computer disk, a hard drive, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of thereof.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

The invention claimed is:

1. An information interaction method, applied to a terminal device, comprising:
   in response to a user logging in a live interface initiated based on a multimedia conference, displaying a live data stream of the multimedia conference in the live interface initiated based on the multimedia conference, wherein the live data stream is generated by a server based on an interactive data stream of a participating user of the multimedia conference, the live data stream is provided by the server;
   receiving an interactive content inputted by the user based on the live data stream during the multimedia conference, and generating interactive information based on the interactive content;
   transmitting the interactive information to a server to instruct the server to transmit the interactive information to a terminal device presenting the live interface; and
   transmitting the interactive information to a user of the multimedia conference in an interface of the multimedia conference.

2. The method according to claim 1, wherein before receiving the interactive content inputted by the user based on the live data stream and generating interactive information based on the interactive content, the method comprises:
   obtaining a user nickname of the user; and
   the receiving an interactive content inputted by the user based on the live data stream and generating interactive information based on the interactive content comprises:
   generating the interactive information based on the interactive content and the user nickname of the user.

3. The method according to claim 2, wherein an association relationship between the user and the user nickname is valid in a time period in which the user views the live data stream.

4. The method according to claim 1, wherein before the in response to a user logging in a live interface initiated based on a multimedia conference, displaying a live data stream of the multimedia conference in the live interface initiated based on the multimedia conference, the method further comprises:

obtaining identity information of the user based on a preset operation performed by the user on a login control; and transmitting the identity information of the user to the server to determine whether the user has an authority to obtain the live data stream.

5. The method according to claim 1, wherein the live interface is arranged in a web page.

6. The method according to claim 1, wherein the interactive information comprises at least one of text interactive information, voice interactive information, and a default emoticon.

7. The method according to claim 1, wherein the receiving an interactive content inputted by the user based on the live data stream and generating interactive information based on the interactive content comprises:

in response to the number of characters of the received interactive content inputted by the user exceeding a preset threshold, displaying a prompt message for prompting that the number of characters exceeds a number limit.

8. The method according to claim 1, wherein the transmitting the interactive information to a server to instruct the server to transmit the interactive information to a terminal device presenting the live interface comprises:

transmitting the interactive information to the server, wherein the server determines based on the interactive information whether to transmit the interactive information to the terminal device presenting the live interface.

9. The method according to claim 8, wherein in a case that the server determines not to transmit the interactive information to the terminal device presenting the live interface, the server transmits a feedback message to the terminal device of the user for prompting that the interactive information is not approved;

in response to receiving the feedback message transmitted by the server for prompting that the interactive information is not approved, displaying a prompt message of the feedback message to the user for prompting that the interactive information is not approved.

10. The method according to claim 9, further comprising:

in response to receiving a feedback message transmitted by the server for prompting that the interactive information is not approved, displaying an interactive text content corresponding to the interactive information in a text information input box displayed in the live interface.

11. The method according to claim 1, further comprising:

displaying the interactive information of the user in the live interface, wherein the interactive information is displayed in at least one of a list mode, a bullet screen mode, and a floating window mode, and the interactive information comprises the interactive content, identity information of the user transmitting the interactive content, and time information of the user transmitting the interactive content.

12. The method according to claim 10, wherein a plurality of pieces of interactive information of at least one user are displayed sequentially in an interactive information list according to time instants at which the plurality of pieces of interactive information are transmitted; or topped interactive information is displayed at a top of the list.

13. The method according to claim 11, wherein the interactive information of the user is displayed in the bullet screen mode;

the displaying the interactive information of the user in the live interface comprises:

determining whether to enable the bullet screen mode based on an operation performed by the user on a preset bullet screen control in the live interface.

14. The method according to claim 12, wherein the terminal device is a terminal device used by a user having a preset authority; and the method further comprises:

in response to receiving a preset operation performed by the user having the preset authority on the displayed interactive information, transmitting information of the preset operation to the server, wherein the server transmits an operation result corresponding to the preset operation to a terminal device of another user, and the preset operation comprises one of topping, deleting, and muting a user transmitting interactive information.

15. An information interaction method, applied to a terminal device, comprising:

receiving a preset live broadcast initiation operation for performing live broadcast on a multimedia conference;

transmitting a live broadcast request to a server for performing live broadcast on the multimedia conference; wherein the server generates a live data stream of the multimedia conference based on the live broadcast request, and the live data stream is generated based on interaction data of a participating user of the multimedia conference; and transmitting the interactive information to a user of the multimedia conference in an interface of the multimedia conference, wherein the interactive information is generated based on an interactive content, the interactive content is inputted by the user based on the live data stream during the multimedia conference.

16. The method according to claim 15, wherein the preset live broadcast initiation operation is performed by any one of: a participating user of the multimedia conference, a viewing user and a preset management user of the multimedia conference.

17. The method according to claim 15, wherein the preset live broadcast initiation operation is performed by a participating user of the multimedia conference; and the preset live broadcast initiation operation comprises: a triggering operation performed by the participating user of the multimedia conference on a live broadcast control for initiating a live broadcast, wherein the live broadcast control is displayed in a display interface for displaying information of the multimedia conference.

18. The method according to claim 15, wherein the preset live broadcast initiation operation is performed before the multimedia conference starts or during the multimedia conference.

19. An information interaction method, applied to a server, comprising:

in response to receiving an acquisition request from a terminal device for acquiring a live data stream of a multimedia conference, transmitting the live data stream to the terminal device, wherein the terminal device displays the live data stream which is supplied by the server in a live interface, the acquisition request is generated by the terminal device based on the live interface of the multimedia conference logged in by a user, and the live data stream is generated by the server based on an interactive data stream of a participating user of the multimedia conference;

receiving interactive information from the terminal device, wherein the interactive information is generated based on interactive content inputted by the user based on the live data stream during the multimedia conference;

transmitting the interactive information to a terminal device presenting the live interface, wherein the terminal device displays the interactive information in the live interface; and transmitting the interactive information to a user of the multimedia conference in an interface of the multimedia conference.

20. The method according to claim 19, wherein the in response to receiving an acquisition request from a terminal device for acquiring a live data stream of a multimedia conference, transmitting the live data stream to the terminal device comprises:

in response to receiving the acquisition request from the terminal device for acquiring the live data stream of the multimedia conference, determining whether the user is a participating user of the multimedia conference based on identity information of the user corresponding to the acquisition request; and in a case that the user is a participating user of the multimedia conference, transmitting the live data stream and a silent playback setting parameter to the terminal device to instruct the terminal device to play the live data stream silently and to display a prompt message of silent playback to the user in text.

21. The method according to claim 19, wherein before transmitting the interactive information to the terminal device presenting the live interface, the method further comprises:

determining whether to transmit the interactive information to the terminal device presenting the live interface based on the interactive information;

in a case of transmitting the interactive information to the terminal device presenting the live interface, transmitting the interactive information to the terminal device presenting the live interface; and in a case of not transmitting the interactive information to the terminal device presenting the live interface, transmitting a feedback message to the terminal device of the user for prompting that the interactive information is not approved.

22. The method according to claim 19, further comprising:

storing the interactive information corresponding to the live data stream of the multimedia conference, and generating an interactive information storage document associated with the multimedia conference.

23. The method according to claim 22, wherein in the interactive information storage document, a time instant when the user transmits the interactive information, the interactive content, and identity information of the user transmitting the interactive information are stored in association.

24. The method according to claim 23, wherein the interactive information storage document is stored in a cloud space of a user having a preset authority for the multimedia conference.

25. The method according to claim 23, further comprising:

for each piece of interactive information, associating the piece of interactive information with a relevant multimedia conference segment corresponding to the piece of interactive information in a recorded live data stream in the interactive information storage document, wherein a live data stream segment of a live data stream corresponding to a piece of interactive information is jumped to in response to clicking on the piece of interactive information by a user.

26. The method according to claim 19, wherein
the live data stream is generated based on a received live broadcast request, and the live broadcast request is transmitted by the terminal device based on a received preset live broadcast initiation operation for performing live broadcast on the multimedia conference.

27. An electronic device, comprising:
one or more processors; and
a storage device, storing one or more programs; wherein
the one or more programs, when executed by the one or more processors, cause the one or more processors to perform the method according to claim 1.

28. An electronic device, comprising:
one or more processors; and
a storage device, storing one or more programs; wherein
the one or more programs, when executed by the one or more processors, cause the one or more processors to perform the method according to claim 15.

29. An electronic device, comprising:
one or more processors; and
a storage device, storing one or more programs; wherein
the one or more programs, when executed by the one or more processors, cause the one or more processors to perform the method according to claim 19.

30. A non-transitory computer-readable medium storing a computer program, wherein the computer program, when executed by a processor, causes the processor to perform the method according to claim 1.

* * * * *